United States Patent
Kim et al.

(10) Patent No.: US 10,006,482 B2
(45) Date of Patent: Jun. 26, 2018

(54) VARIABLE COMPRESSION RATIO APPARATUS

(71) Applicant: HYUNDAI MOTOR COMPANY, Seoul (KR)

(72) Inventors: Won Gyu Kim, Seoul (KR); Myungsik Choi, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 177 days.

(21) Appl. No.: 15/258,014

(22) Filed: Sep. 7, 2016

(65) Prior Publication Data

US 2017/0284455 A1    Oct. 5, 2017

(30) Foreign Application Priority Data

Apr. 1, 2016  (KR) .................. 10-2016-0040401

(51) Int. Cl.
| F02B 75/04 | (2006.01) |
| F16C 7/06 | (2006.01) |
| F16J 1/16 | (2006.01) |
| F15B 15/02 | (2006.01) |

(52) U.S. Cl.
CPC .............. *F16C 7/06* (2013.01); *F02B 75/045* (2013.01); *F15B 15/02* (2013.01); *F16J 1/16* (2013.01)

(58) Field of Classification Search
CPC . F16C 7/06; F15B 15/02; F02B 75/045; F16J 1/16
See application file for complete search history.

(56) References Cited

U.S. PATENT DOCUMENTS

| 4,721,073 A | * | 1/1988 | Naruoka et al. ....... | F02B 75/045 123/78 BA |
| 6,752,105 B2 | * | 6/2004 | Gray, Jr. ................. | F02B 75/00 123/48 B |
| 8,393,307 B2 | * | 3/2013 | Lee et al. ............... | F02B 75/044 123/48 B |
| 2017/0204784 A1 | * | 7/2017 | O'Shea ................. | F02B 75/045 |
| 2017/0241333 A1 | * | 8/2017 | Roth et al. ............ | F02B 75/045 |

FOREIGN PATENT DOCUMENTS

| JP | H03-242434 A | 10/1991 |
| JP | 2009-108864 A | 5/2009 |
| KR | 10-2011-0037392 | 4/2011 |

* cited by examiner

*Primary Examiner* — Thomas E Lazo
(74) *Attorney, Agent, or Firm* — Brinks Gilson & Lione

(57) ABSTRACT

A variable compression ratio apparatus may include: a piston pin; a small diameter eccentric cam disposed on a piston; a large diameter eccentric cam disposed between the small diameter eccentric cam and a small end portion of a connecting rod; a first plunger movably disposed in a first plunger space inside the piston pin; a second plunger movably disposed in a second plunger space formed inside the piston pin; and first and second oil injection nozzles disposed at a lower portion of the piston. In particular, the first and second oil injection nozzles control a control position of the first and second plungers by supplying hydraulic pressure to an end portion of the first plunger and the other portion of the second plunger through first and second guide passages formed inside the piston by injecting oil to the lower portion of the piston.

16 Claims, 8 Drawing Sheets

Section A-A

Section B-B

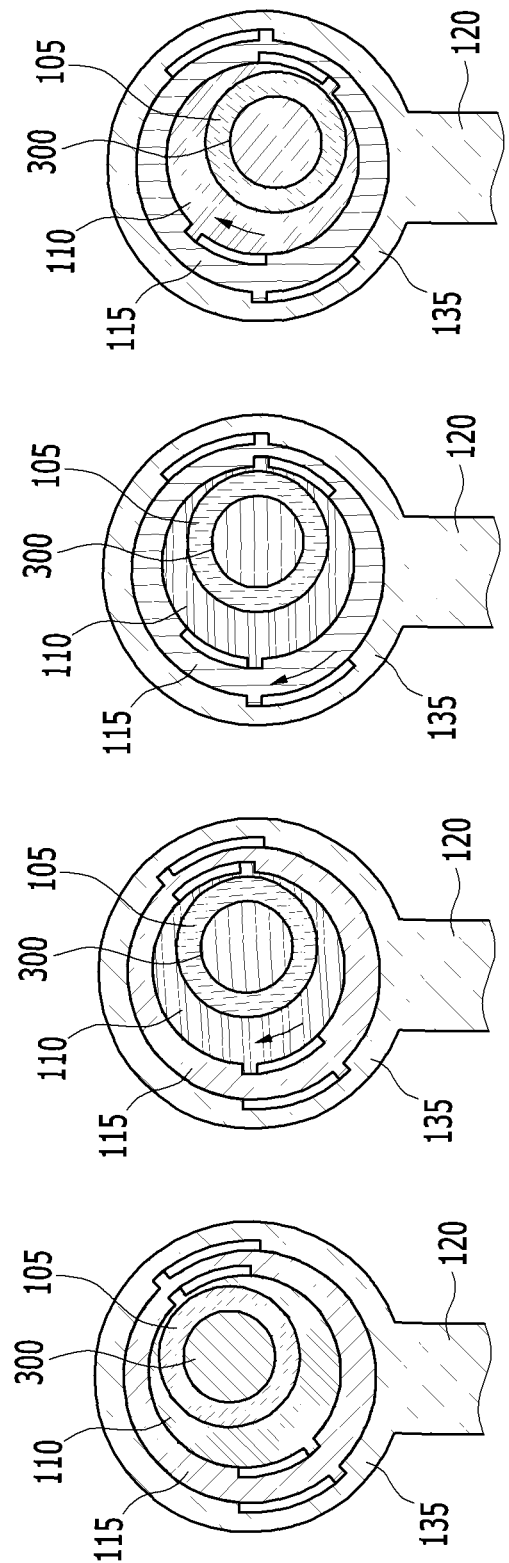

VARIABLE COMPRESSION RATIO APPARATUS

CROSS-REFERENCE TO RELATED APPLICATION

This application claims priority to and the benefit of Korean Patent Application No. 10-2016-0040401, filed on Apr. 1, 2016, the entire contents of which are incorporated herein by reference.

FIELD

The present disclosure relates to an internal combustion engine. More particularly, the present disclosure relates to a variable compression ratio apparatus to improve fuel efficiency.

BACKGROUND

The statements in this section merely provide background information related to the present disclosure and may not constitute prior art.

Generally, thermal efficiency of combustion engines increases as the compression ratio thereof increases, and if ignition timing is advanced to some degree, thermal efficiency of spark-ignition engines increases.

However, if the ignition timing of the spark-ignition engines is advanced at a high compression ratio, abnormal combustion may occur and the engine may be damaged. Thus, the ignition timing cannot be excessively advanced and accordingly engine output may deteriorate.

A variable compression ratio (VCR) apparatus changes the compression ratio of an air-fuel mixture according to a driving condition of the engine.

The variable compression ratio apparatus raises the compression ratio of the air-fuel mixture at a low-load condition of the engine in order to improve fuel mileage. On the contrary, the variable compression ratio apparatus lowers the compression ratio of the air-fuel mixture at a high-load condition of the engine in order to inhibit or prevent occurrence of knocking and improve engine output.

The above information disclosed in this Background section is only for enhancement of understanding of the background of the present disclosure and therefore it may contain information that does not form the prior art that is already known to a person of ordinary skill in the art.

SUMMARY

The present disclosure provides a variable compression ratio apparatus which may improve performance and decrease fuel consumption by changing compression ratio in multistep and controlling the compression ratio more precisely.

The present disclosure also provides a variable compression ratio apparatus that has very little power loss since the number of oil path decreases and the loss of oil pressure for changing compression ratio is small by controlling oil control plunger using the oil-jet injection nozzle which is arranged under a piston.

As described above, a variable compression ratio apparatus according to one form of the present disclosure may include: a piston pin connecting a piston and a small end portion of a connecting rod, a small diameter eccentric cam disposed at an outer circumference surface of the piston in an eccentric state with a center axis of the piston pin, a large diameter eccentric cam disposed between an outer circumference surface of the small diameter eccentric cam and an inner circumference surface of the small end portion of the connecting rod in an eccentric state with a center axis of the piston pin, a first plunger movably disposed in a first plunger space formed at a side inside the piston pin so as to control a rotational position of the small diameter eccentric cam by controlling oil supplied to first and second chambers formed between the outer circumference surface of the small diameter eccentric cam and an inner circumference surface of the large diameter eccentric cam according to a control position, a second plunger movably disposed in a second plunger space formed at the other side inside the piston pin so as to control a rotational position of the large diameter eccentric cam by controlling oil supplied to third and fourth chambers formed between an outer circumference surface of the large diameter eccentric cam and the inner circumference surface of the small end portion according to a control position, and first and second oil injection nozzles disposed at a side and the other side of a lower portion of the piston, respectively, and controlling the control position of the first and second plungers by supplying hydraulic pressure to an end portion of the first plunger and the other portion of the second plunger through first and second guide passages formed inside the piston by injecting oil to the lower portion of the piston.

A first pocket may be formed at a lower side of the piston, and a first guide passage is formed inside the piston so as to deliver oil from the first pocket to the end portion of the first plunger, and a second pocket may be formed at the other lower side of the piston, and a second guide passage is formed inside the piston so as to deliver oil from the second pocket to the other end of the second plunger.

The first and second oil-jet injection nozzles may control positions of the first and second plungers by injecting oil to the first and second pockets and delivering oil to the end portion of the first plunger and the other portion of the second plunger through the first guide passage and the second guide passage.

A groove that is divided into the first chamber and the second chamber by a first protrusion protruded from a side of an outer circumference surface of the small diameter eccentric cam may be formed on the inner circumference surface of the large diameter eccentric cam, and a groove that is divided into the third chamber and the fourth chamber by a second protrusion protruded from a side of an outer circumference surface of the large diameter eccentric cam may be formed on the inner circumference surface of the small end portion of the connecting rod.

The first and second plungers may be respectively disposed at a side and the other side of inside of the valve body that penetrates a center portion of the piston pin in a length direction.

The apparatus may further include a first return spring disposed inside the valve body so as to elastically support the first plunger in a side, and a second return spring disposed inside the valve body so as to elastically support the second plunger in the other side.

A first check space may be formed at an end portion of inside of the first plunger, and a second check space may be formed at the other end portion of inside of the first plunger, a first check space connection passage may be formed inside the first plunger to connect the first check space with the second check space, a portion on which the first check space and the second check space are formed on an outer circumference surface of the first plunger may contact an inner circumference of the first plunger space, a first small diameter portion may be formed at the center portion where the first check space connection passage is formed in a predetermined gap with the first plunger space, in the first check space connection passage, a first open passage passing through an outer circumference surface may be formed, in the first plunger, a first check passage that goes through outside is formed, and in the second check space, a second check passage that goes through outside may be formed, in the valve body, a first supply passage connected to the first small diameter portion at all times and supplied with hydraulic pressure from the connecting rod may be formed, a second chamber connection passage may be formed, that is connected to the second check passage and connected to the second chamber through a side from an inner circumference surface to an outer circumference surface of the valve body, in a state that the first plunger is moved to a side by the first return spring, and a first chamber connection passage may be formed, that is connected to the first check passage and connected to the first chamber through a side from the inner circumference surface to the outer circumference surface of the valve body, in a state that the first plunger is moved to the other side by the first oil-jet injection nozzle.

A third check space may be formed at an end portion of inside of the second plunger, and a fourth check space may be formed at the other end portion of inside of the second plunger, a second check space connection passage may be formed inside the second plunger to connect the third check space with the fourth check space, a portion on which the third check space and the fourth check space are formed on an outer circumference surface of the second plunger may contact an inner circumference of the second plunger space, a second small diameter portion may be formed at the center portion where the second check space connection passage is formed in a predetermined gap with the second plunger space, in the second check space connection passage, a second open passage passing through an outer circumference surface may be formed, in the second plunger, a third check passage that goes through outside may be formed, and in the fourth check space, a fourth check passage that goes through outside is formed, in the valve body, a second supply passage connected to the second small diameter portion at all times and supplied with hydraulic pressure from the connecting rod may be formed, a fourth chamber connection passage may be formed, that is connected to the third check passage and connected to the fourth chamber through a side from an inner circumference surface to an outer circumference surface of the valve body, in a state that the second plunger is moved to the other side by the second return spring, and a third chamber connection passage may be formed, that is connected to the fourth check passage and connected to the third chamber through a side from the inner circumference surface to the outer circumference surface of the valve body, in a state that the first plunger is moved to the other side by the second oil-jet injection nozzle.

The apparatus may include a first check valve disposed in the first check space, inhibiting or preventing hydraulic pressure being transferred to the check space connection passage from the first check space, and a second check valve disposed in the second check space, inhibiting or preventing hydraulic pressure being transferred to the check space connection passage from the second check space.

The apparatus may include a third check valve disposed in the third check space, inhibiting or preventing hydraulic pressure being transferred to the first check space connection passage from the third check space, and a fourth check valve disposed in the fourth check space, inhibiting or preventing hydraulic pressure being transferred to the second check space connection passage from the fourth check space.

The apparatus may include first and second oil-jet control valves controlling oil injected from the first and second oil-jet injection nozzles, and a control unit controlling the first and second oil-jet control valves according to an operation condition.

A bent hole may be formed in the valve body for releasing hydraulic pressure therein to outside with being opened in the first and second plunger spaces in the first and second return springs to outside.

The first, second, third and fourth check valves may include a ball disposed in the oil passage, and a check spring for elastically supporting the ball.

The apparatus may further include an oil pump for pumping oil to the first and second oil-jet control valve.

A main oil supply passage may be formed inside the connecting rod, oil supplied to the main oil supply passage may be supplied to a side of the first and second plungers, and the oil supplied to the main oil supply passage may be transferred to each of the first, second, third and fourth chambers, thereby controlling rotational position of the small diameter eccentric cam or the large diameter eccentric cam according to a position of the first and second plungers.

According to the present disclosure, maximum four steps of variable compression ratio may be implemented using the large diameter eccentric cam and the small diameter eccentric cam, the accuracy in control may be improved by embedding a plunger for hydraulic pressure control.

Further, by controlling the position of the plunger using the oil-jet injected from the oil-jet injection nozzle that is disposed under the piston, the oil path may become relatively simple, and the efficiency in control may be improved.

Herein, a technical effect not described herein may be realized in the process of implementing the present disclosure, and such a technical effect not described herein is included in the technical effect of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 8A-8D are cross-sectional views illustrating the portion that the piston and the connecting rod are connected in each of the operation modes in a variable compression ratio apparatus according to the present disclosure.

Figure 1:
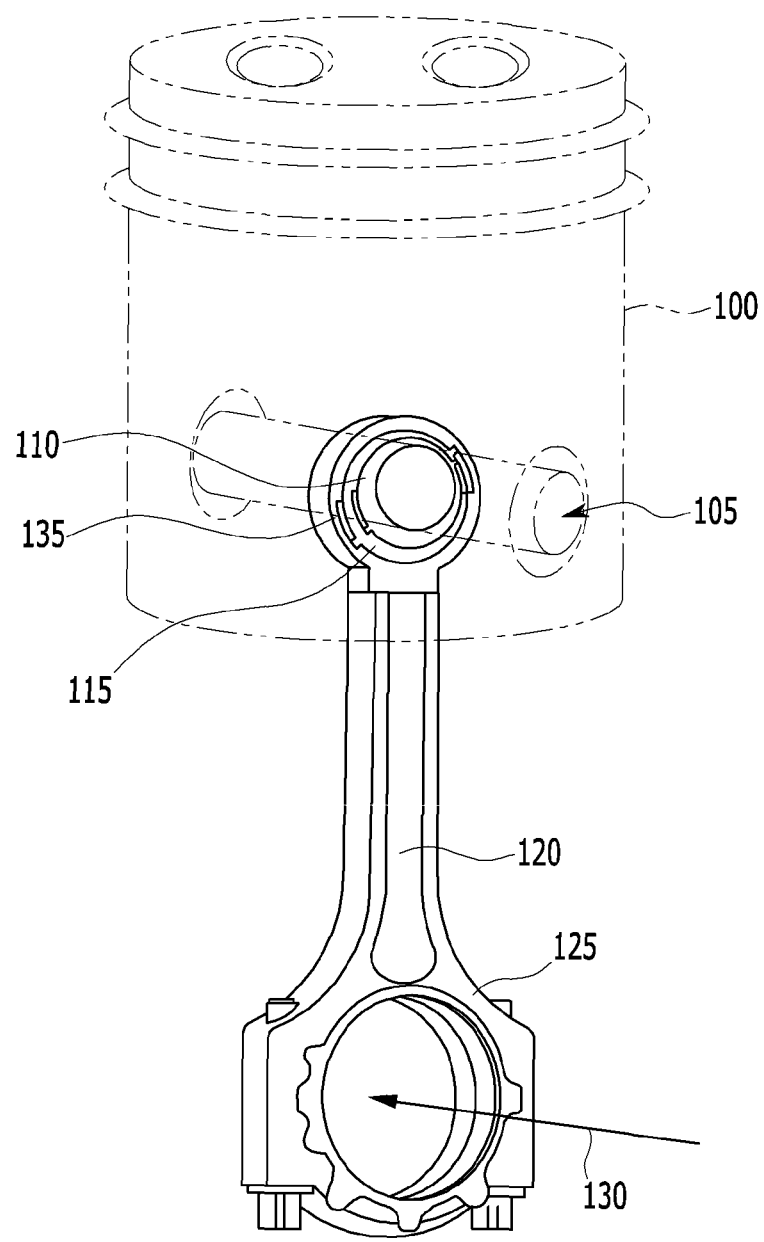
FIG. 1 is schematic diagram illustrating a variable compression ratio apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, since the size and the thickness of each element shown in the drawings are represented in arbitrary scale for the convenience of description, the present disclosure is not limited thereto, and the thickness is enlarged in order to clearly represent several parts and regions.

Further, in order to clearly describe the exemplary forms of the present disclosure, the part that is not in relation to the description is omitted.

The term "first", "second", or the like is used for distinguishing elements that have the same title, but the titles are not limited to the order.

Referring to FIG. 1, a variable compress ratio apparatus includes: a connecting rod 120, a piston pin 105, a piston 100, a small end portion 135, a big end portion 125, a small diameter eccentric cam 110, a large diameter eccentric cam 115 and a crank pin 130.

The small end portion (small diameter portion) 135 of the connecting rod 120 is connected to the piston 100 through the piston pin 105, and the large end portion (large diameter portion) 125 is connected to the crank pin 130 of the crank shaft.

The piston pin 105 connects the piston 100 with the connecting rod 120 through the piston 100 and the small end portion 135 of the connecting rod 120.

In addition, the small diameter eccentric cam 110 has a ring structure, and the piston pin 105 slidably penetrates the small diameter eccentric cam 110. And the large diameter eccentric cam 115 has a ring structure, and is engaged between the outer surface of the small diameter eccentric cam 110 and the inner surface of the small end portion 135.

In one form of the present disclosure, the hydraulic pressure of the oil supplied through the connecting rod 120 rotates each of the small diameter eccentric cam 100 and the large diameter eccentric cam 115, and control the position of the piston pin 105 and the piston 100 upwardly and downwardly, thereby implementing low compression ratio and high compression ratio in multistep mode.

Furthermore, inside the piston pin 105, a plunger is located to control the rotational position of the small diameter piston 100 and the large diameter piston 100. The detailed structure thereof is referred to FIG. 4 and FIG. 5.

Figure 2:
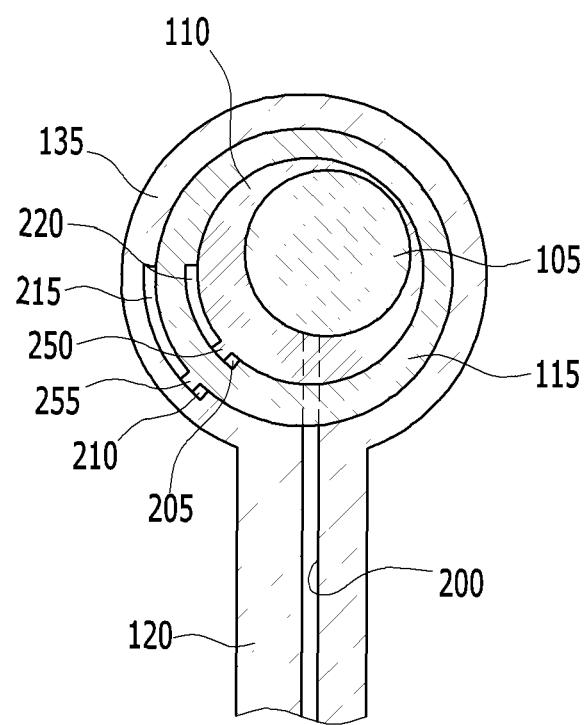
FIG. 2 is a cross-sectional view of a portion where the piston and the connecting rod are connected in a variable compression ratio apparatus according to one form of the present disclosure.

FIG. 2 is a cross-sectional view of a portion where the piston and the connecting rod are connected in a variable compression ratio apparatus according to the present disclosure.

Referring to FIG. 2, the variable compression ratio apparatus includes: a connecting rod 120, a main oil supply passage 200, a large diameter eccentric cam 115, a small diameter eccentric cam 110, a piston pin 105, a first protrusion 250, a second protrusion 255, a first chamber 205, a second chamber 220, a third chamber 210 and a fourth chamber 215.

Through the main oil supply passage 200 that is formed inside the connecting rod 120, oil is supplied to the plunger disposed inside the piston pin 105. The plunger supplies the oil to each of the first chamber 205, the second chamber 220, the third chamber 210, or the fourth chamber 215, and controls the rotational position of the small diameter eccentric cam 110 and the large diameter eccentric cam 115.

The first protrusion 250 is protruded from one side of the outer circumference of the small diameter eccentric cam 110, and the first protrusion 250 divides the groove that is formed on the inner circumference of the large diameter eccentric cam 115 into the first chamber 205 and the second chamber 220. In addition, the second protrusion 255 is protruded from a side of the outer circumference of the large diameter eccentric cam 115, and the second protrusion 255 divides the groove that is formed on the inner circumference of the small end portion 135 into the third chamber 210 and the fourth chamber 215.

In one form, when oil is supplied to the first chamber 205 and the oil in the second chamber 220 is returned, the small diameter eccentric cam 110 rotates clockwise and the piston pin 105 is lowered. In addition, when oil is supplied to the third chamber 210 and the oil in the fourth chamber 215 is returned, the large diameter eccentric cam 115 rotates clockwise and the piston pin 105 is lowered.

On the other hand, when oil is supplied to the second chamber 220 and the oil in the first chamber 205 is returned, the small diameter eccentric cam 110 rotates counter clockwise and the piston pin 105 is raised. In addition, when oil is supplied to the fourth chamber 215 and the oil in the third chamber 210 is returned, the large diameter eccentric cam 115 rotates counter clockwise and the piston pin 105 is raised.

Figure 3:
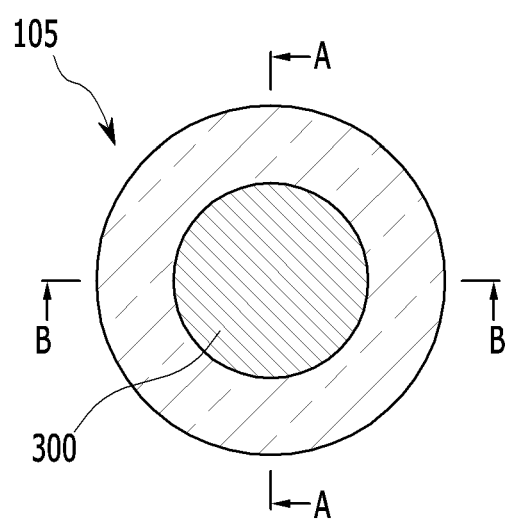
FIG. 3 is a side view illustrating a piston pin of a variable compression ratio apparatus according to the present disclosure.

FIG. 3 is a side view illustrating a piston pin of a variable compression ratio apparatus.

Referring to FIG. 3, at a center part in the length direction of the piston pin, the valve body 300 is inserted, and a plunger is dispose inside the valve body 300. In another form, the plunger may be installed inside the piston pin 105 without the valve body 300.

Figure 4:
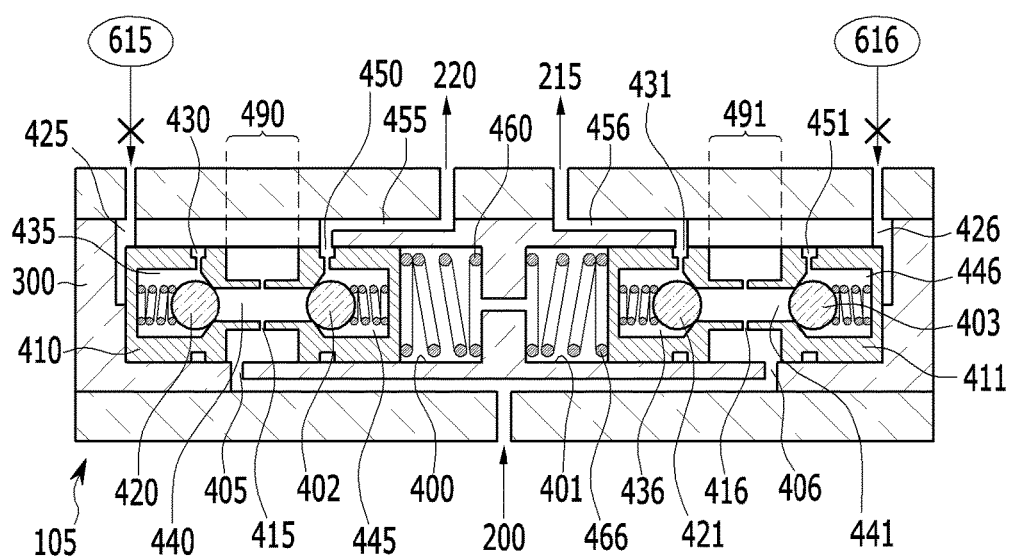
FIG. 4 is a cross-sectional view in a length direction of the piston pin along A-A line of FIG. 3 in a variable compression ratio apparatus.

FIG. 4 is a cross-sectional view in a length direction of the piston pin along A-A line of FIG. 3 in a variable compression ratio apparatus.

Referring to FIG. 4, the piston pin 105 includes: a first plunger space 400, a second check valve 402, a first open passage 415, a first supply passage 405, a first check valve 420, a first plunger 410, a valve body 300, a first check space 435, a first oil-jet passage 425, a first check passage 430, a first check space connection passage 440, a first small diameter portion 490, a second check passage 450, a second chamber connection passage 455, a second check space 445, a first return spring 460, a second return spring 461, a third check space 436, a fourth chamber connection passage 456, a third check passage 431, a second small diameter portion 491, a second check space connection passage 441, a fourth check passage 451, a second oil-jet passage 426, a fourth check space 446, and a second plunger 411.

At a center portion in the length direction of the piston pin 105, the valve body 300 is disposed. At an end portion of the valve body 300, a first plunger space is formed, and at the other end portion of the valve body 300, a second plunger space 401 is formed. The first plunger 410 is fixed in the first plunger space 400, and the second plunger 411 is fixed in the second plunger space 401.

In an end portion of the first plunger 410, the first check space 435 is formed, and in the other portion of the first plunger 410, the second check space 445 is formed. The first check space connection passage 440 that connects the first check space 435 and the second check space 445 is formed in the first plunger 410.

In the first plunger 410, the first small diameter portion 490 is formed, which corresponds to the first check space connection passage 440, and the outer circumference except the first small diameter portion 490 contacts the inner circumference of the valve body 300.

In the first check space connection passage 440, the first open passage 415 that goes through the outside is formed. And, in the first check space 435, the first check passage 430 that goes through the outside is formed, and in the second check space 445, the second check passage 450 is formed.

The first check valve 420 is disposed inside the first check space 435. The first check valve 420 inhibits or prevents the oil in the first check space 435 from being discharged to the first check space connection passage 440, and the oil in the first check space connection passage 440 inflows into the first check space 435.

In addition, the second check valve 402 is disposed inside the second check space 445. The second check valve 402 inhibits or prevents the oil in the second check space 445 from being discharged to the first check space connection passage 440, and the oil in the first check space connection passage 440 inflows into the second check space 445.

The oil supplied through the main oil supply passage 200 of the connecting rod 120 is supplied to the space that corresponds to the first small diameter portion 490 of the first plunger 410 through the piston pin 105 and the first supply passage 405 that is formed in the valve body 300. And, the second check passage 450 is selectively connected to the second chamber 220 through the second chamber connection passage 455 that is formed in the valve body 300.

In one form of the present disclosure, the first return spring 460 connects the second check passage 450 with the second chamber connection passage 455 by elastically supporting the first plunger 410 in an end direction, and receives the oil-jet of the first oil-jet injection nozzle 615 (in FIG. 6) through the first oil-jet passage 425 that is formed at an end portion of the piston pin 105 and the valve body 300.

Figure 5:
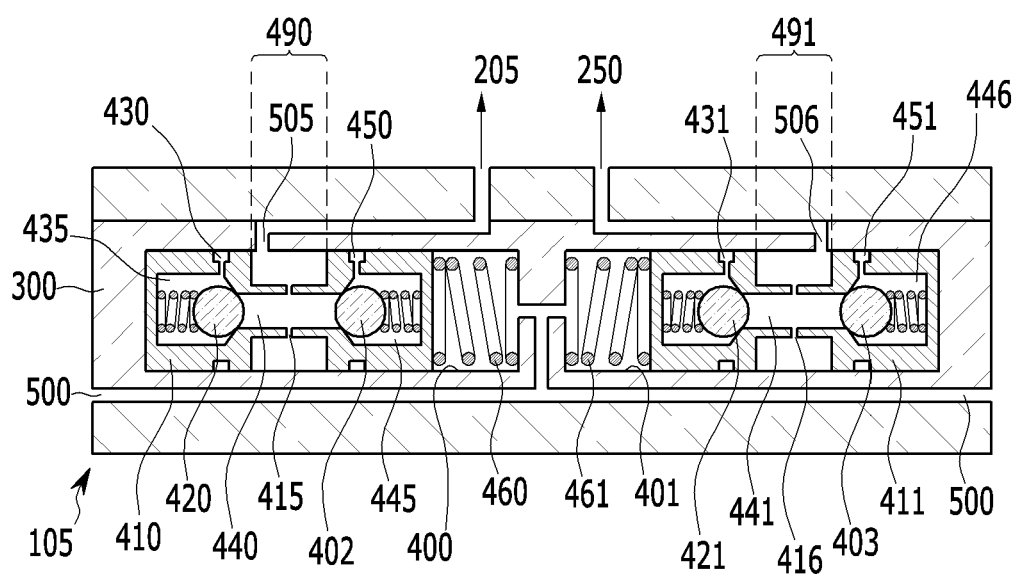
FIG. 5 is a cross-sectional view in a length direction of the piston pin along B-B line of FIG. 3 in a variable compression ratio apparatus.

FIG. 5 is a cross-sectional view in a length direction of the piston pin along B-B line of FIG. 3 in a variable compression ratio apparatus. In comparison with FIG. 4, the detailed description for the similar or the same part is omitted, and main different points will be described.

Referring to FIG. 5, in an end portion of the second plunger 411, the third check space 436 is formed, and in the other end portion thereof, the fourth check space 446 is formed. The second check space connection passage 441 that connects the third check space 436 with the fourth check space 446 is formed in the second plunger 411.

In the second plunger 411, the second small diameter portion 491 is formed, which corresponds to the second check space connection passage 441, and the outer circumference surface except the second small diameter portion 491 contacts the inner circumference surface of the valve body 300.

In the second check space connection passage 441, the second open passage 416 that goes through the outside is formed. And, in the third check space 436, the third check passage 431 that goes through the outside is formed, and in the fourth check space 446, the fourth check passage 451 is formed.

Inside the third check space 436, the third check valve 421 is disposed. The third check valve 421 inhibits or prevents the oil in the third check space 436 from being discharged to the second check space connection passage 441, and the oil in the second check space connection passage 441 inflows into the third check space 436.

In addition, the fourth check valve 403 is disposed inside the fourth check space 446. The fourth check valve 403 inhibits or prevents the oil in the fourth check space 446 from being discharged to the second check space connection passage 441, and the oil in the second check space connection passage 441 inflows into the fourth check space 446.

Referring to FIG. 4 and FIG. 5, the oil supplied through the main oil supply passage 200 of the connecting rod 120 is supplied to the space that corresponds to the second small diameter portion 491 of the second plunger 411 through the piston pin 105 and the second supply passage 406 formed in the valve body 300. And, the fourth check passage 451 is selectively connected to the third chamber 210 through the third chamber connection passage 506 formed in the valve body 300, and the first check passage 430 is selectively connected to the first chamber 205 through the first chamber connection passage 505 that is formed in the valve body 300.

In one form, the second return spring 461 may connect the third check passage 431 with the fourth chamber connection passage 456 by elastically supporting the second plunger 411 in the other end direction, and receive the oil-jet of the second oil-jet injection nozzle 616 (in FIG. 6) through the second oil-jet passage 426 formed at an end portion of the piston pin 105 and the valve body 300.

Figure 6:
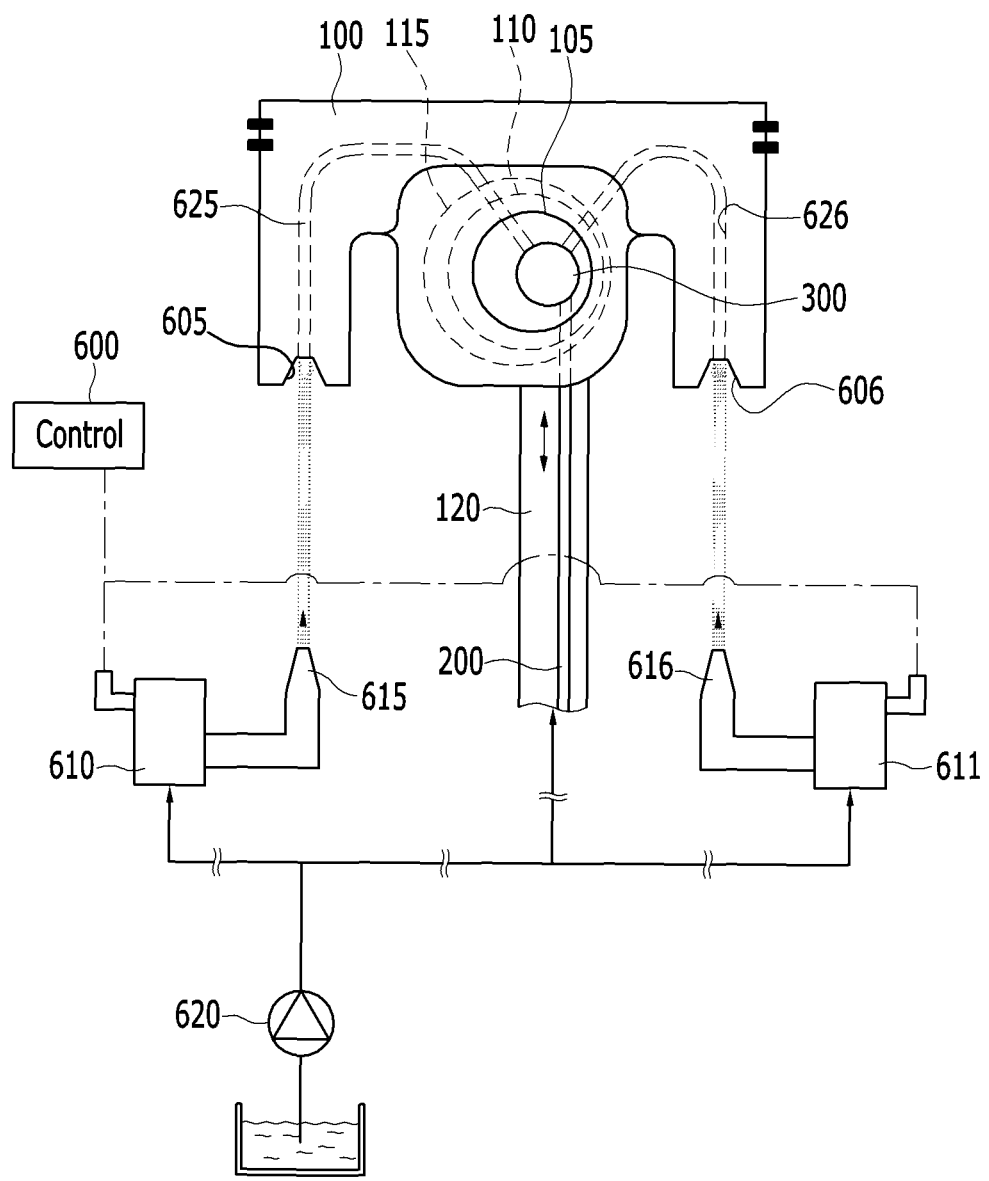
FIG. 6 is a schematic diagram illustrating a variable compression ratio apparatus according to one form of the present disclosure.

FIG. 6 is a schematic diagram illustrating a variable compression ratio apparatus.

Referring to FIG. 6, at a side of a lower portion edge of the piston 100, a first pocket 605 is formed, and at the other side of the lower portion edge thereof, a second pocket 606 is formed. A first guide passage 625 is formed from the first pocket 605 to the valve body 300, and a second guide passage 626 is formed from the second pocket 606 to the valve body 300.

At a side of a lower portion of the piston 100, a first oil-jet injection nozzle 615 is disposed, and at the other side of the lower portion of the piston 100, a second oil-jet injection nozzle 616 is disposed. The first oil-jet injection nozzle 615 is disposed to inject oil to the first pocket 605, and the second oil-jet injection nozzle 616 is disposed to inject oil to the second pocket 606.

Further, a first oil-jet control valve 610 is disposed to control the oil that is pumped by an oil pump 620, and injects oil through the first oil-jet injection nozzle 615. The second oil-jet control valve 611 is disposed to control the oil that is pumped by the oil pump 620, and injects oil through the second oil-jet injection nozzle 616.

In addition, the control unit 600 controls the injection of oil-jet by controlling the first oil-jet control valve 610 and the second oil-jet control valve 611 according to a driving condition.

FIGS. 7A-7D are cross-sectional views illustrating each of the operation modes of a variable compression ratio apparatus.

Figure 7A:
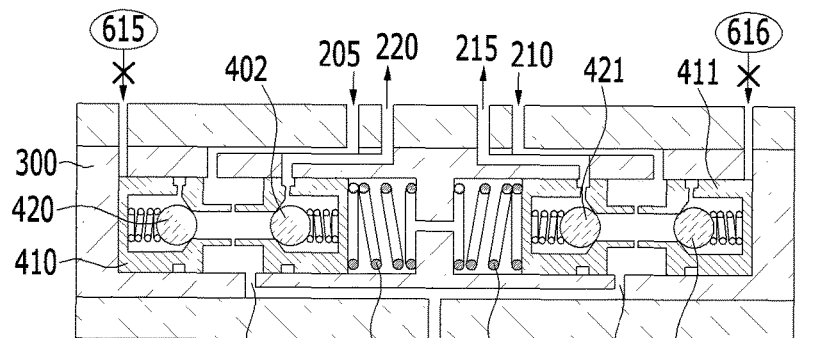
FIGS. 7A-7D are cross-sectional views illustrating each of the operation modes of a variable compression ratio apparatus according to one form of the present disclosure.

Referring to FIG. 7A, the oil is not injected from the first oil-jet injection nozzle 615, and the first plunger 410 is located at an end portion in the valve body 300 by the first return spring 460. And, the oil is not injected from the second oil-jet injection nozzle 616, and the second plunger 411 is moved to a right direction in the valve body 300 by the second return spring 461.

And, the oil supplied through the main oil supply passage 200 is supplied to the second chamber 220 through the first open passage 415 of the first plunger 410, the first check space connection passage 440 and the second check valve 402, and the oil in the first chamber 205 is returned to the second chamber 220 through the first open passage 415, the first check space connection passage 440 and the second check valve 402 by the pressure change applied to the piston 100. Accordingly, the small diameter eccentric cam 110 rotates clockwise in FIG. 2.

In addition, the oil supplied through the main oil supply passage 200 is supplied to the fourth chamber 215 through the second open passage 416 of the second plunger 411 and the third check valve 421, and the oil in the third chamber 210 is returned to the fourth chamber 215 through the second open passage 416 and the third check valve 421 by the pressure change. Accordingly, the large diameter eccentric cam 115 rotates counter clockwise in FIG. 2.

Figure 7B:
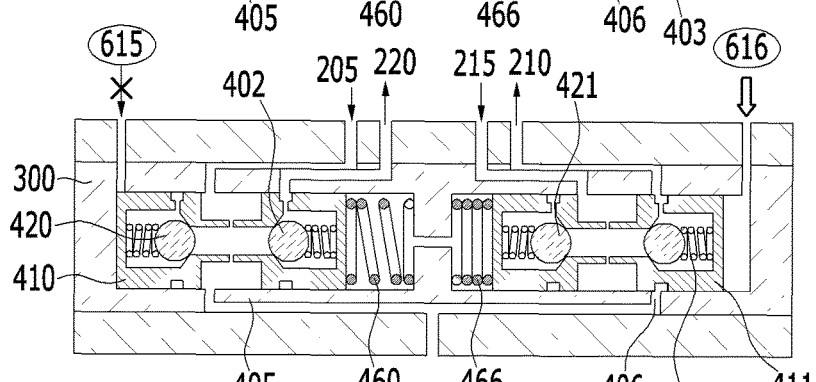

Referring to FIG. 7B, the oil is not injected from the first oil-jet injection nozzle 615, and the first plunger 410 is located at an end portion in the valve body 300 by the first return spring 460. And, the oil is injected from the second oil-jet injection nozzle 616, and the second plunger 411 is moved to a left direction in the valve body 300.

And, the oil supplied through the main oil supply passage 200 is supplied to the second chamber 220 through the first open passage 415 of the first plunger 410, the first check space connection passage 440 and the second check valve 402, and the oil in the first chamber 205 is returned to the second chamber 220 through the first open passage 415, the first check space connection passage 440 and the second check valve 402 by the pressure change applied to the piston 100. Accordingly, the small diameter eccentric cam 110 rotates clockwise in FIG. 2.

In addition, the oil supplied through the main oil supply passage 200 is supplied to the third chamber 210 through the second open passage 416 of the second plunger 411 and the fourth check valve 403, and the oil in the fourth chamber 215 is returned to the third chamber 210 through the second open passage 416 and the fourth check valve 403 by the pressure change. Accordingly, the large diameter eccentric cam 115 rotates counter clockwise in FIG. 2.

Figure 7C:
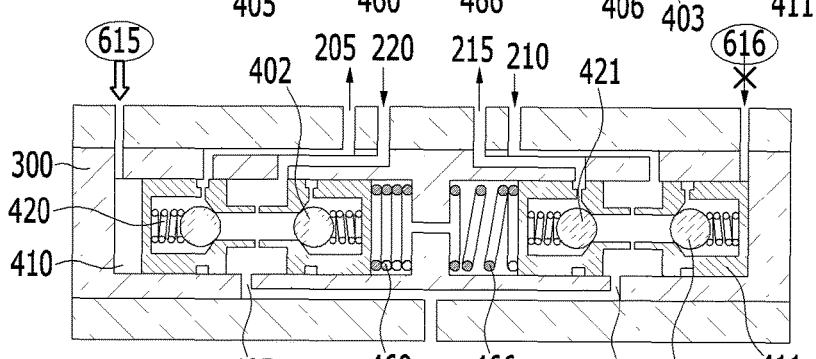

Referring to FIG. 7C, the oil is injected from the first oil-jet injection nozzle 615, and the first plunger 410 is located at the other end portion (right side) in the valve body 300. And, the oil is not injected from the second oil-jet injection nozzle 616, and the second plunger 411 is moved to a right direction in the valve body 300.

And, the oil supplied through the main oil supply passage 200 is supplied to the second chamber 220 through the first open passage 415 of the first plunger 410, the first check space connection passage 440 and the first check valve 420, and the oil in the second chamber 220 is returned to the first chamber 205 through the first open passage 415, the first check space connection passage 440 and the first check valve 420 by the pressure change applied to the piston. Accordingly, the small diameter eccentric cam 110 rotates counter clockwise in FIG. 2.

In addition, the oil supplied through the main oil supply passage 200 is supplied to the fourth chamber 215 through the second open passage 416 of the second plunger 411 and the third check valve 421, and the oil in the third chamber 210 is returned to the fourth chamber 215 through the second open passage 416 and the third check valve 421 by the pressure change. Accordingly, the large diameter eccentric cam 115 rotates counter clockwise in FIG. 2.

Figure 7D:
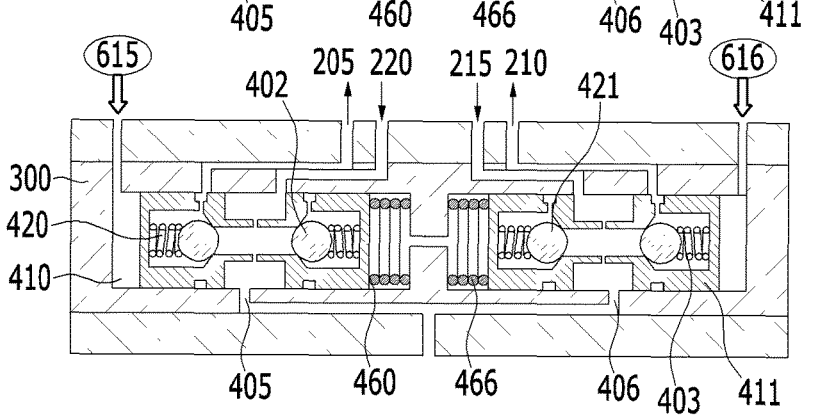

Referring to FIG. 7D, the oil is injected from the first oil-jet injection nozzle 615, and the first plunger 410 is located at the other end portion (right side) in the valve body 300. And, the oil is not injected from the second oil-jet injection nozzle 616, and the second plunger 411 is moved to a right direction in the valve body 300.

And, the oil supplied through the main oil supply passage 200 is supplied to the second chamber 220 through the first open passage 415 of the first plunger 410, the first check space connection passage 440 and the first check valve 420, and the oil in the second chamber 220 is returned to the first chamber 205 through the first open passage 415, the first check space connection passage 440 and the first check valve 420 by the pressure change applied to the piston 100. Accordingly, the small diameter eccentric cam 110 rotates counter clockwise in FIG. 2.

In addition, the oil supplied through the main oil supply passage 200 is supplied to the fourth chamber 215 through the second open passage 416 of the second plunger 411 and the fourth check valve 403, the oil in the fourth chamber 215 is returned to the third chamber 210 through the second open passage 416 and the fourth check valve 403 by the pressure change. Accordingly, the large diameter eccentric cam 115 rotates clockwise in FIG. 2.

FIGS. 8A-8D are cross-sectional views illustrating the portion that the piston and the connecting rod are connected in each of the operation modes in a variable compression ratio apparatus.

FIG. 8A corresponds to FIG. 7C, and the small diameter eccentric cam 110 and the large diameter eccentric cam 115 rotate counter clockwise. Accordingly, high compression ratio is implemented.

FIG. 8B corresponds to FIG. 7A, and the small diameter eccentric cam 110 rotates clockwise and the large diameter eccentric cam 115 rotates counter clockwise. Accordingly, the first middle compression ratio is implemented.

FIG. 8C corresponds to FIG. 7D, and the small diameter eccentric cam 110 rotates counter clockwise and the large diameter eccentric cam 115 rotates clockwise. Accordingly, the second middle compression ratio is implemented.

FIG. 8D corresponds to FIG. 7B, and the small diameter eccentric cam 110 rotates clockwise and the large diameter eccentric cam 115 rotates clockwise. Accordingly, low compression ratio is implemented.

As described above, four steps of variable compression ratio may be implemented using the large diameter eccentric cam 115 and the small diameter eccentric cam 110, the accuracy in control may be improved by embedding a plunger for hydraulic pressure control.

Further, by controlling the position of the plunger using the oil-jet injected from the oil-jet injection nozzle that is disposed under the piston 100, the oil path may become relatively simple, and the efficiency in control may be improved.

While the present disclosure has been described in connection with exemplary forms, it is to be understood that the present disclosure is not limited to the disclosed forms. On the contrary, it is intended to cover various modifications and equivalent arrangements by a skilled person in the art included within the spirit and scope of the forms of the present disclosure.

| <Description of symbols> | |
|---|---|
| 100: piston | 105: piston pin |
| 110: small diameter eccentric cam | 115: large diameter eccentric cam |
| 120: connecting rod | 125: big end portion |
| 130: crank pin | 135: small end portion |
| 200: main oil supply passage | 205: first chamber |
| 210: third chamber | 215: fourth chamber |
| 220: second chamber | 300: valve body |
| 400: first plunger space | 401: second plunger space |
| 402: second check valve | 403: fourth check valve |
| 410: first plunger | 411: second plunger |
| 405: first supply passage | 406: second supply passage |
| 415: first open passage | 416: second open passage |
| 420: first check valve | 421: third check valve |
| 425: first oil-jet passage | 426: second oil-jet passage |
| 430: first check passage | 431: third check passage |
| 435: first check space | 436: third check space |
| 445: second check space | 446: fourth check space |
| 450: second check passage | 451: fourth check passage |
| 440: first check space connection passage | |
| 441: second check space connection passage | |
| 455: second chamber connection passage | |
| 456: fourth chamber connection passage | |
| 460: first return spring | 461: second return spring |
| 505: first chamber connection passage | 506: third chamber connection passage |
| 600: control unit | 605: first pocket |
| 606: second pocket | 610: first oil-jet control valve |
| 611: second oil-jet control valve | 615: first oil-jet injection nozzle |
| 616: second oil-jet injection nozzle | 620: hydraulic pump |
| 625: first guide passage | 626: second guide passage |
| 250: first protrusion | 255: second protrusion |
| 490: first small diameter portion | 491: second small diameter portion |

What is claimed is:

1. A variable compression ratio apparatus, comprising:
a piston pin connecting a piston and a small end portion of a connecting rod;
a small diameter eccentric cam disposed at an outer circumference surface of the piston pin in an eccentric state with a center axis of the piston pin;
a large diameter eccentric cam disposed between an outer circumference surface of the small diameter eccentric cam and an inner circumference surface of the small end portion of the connecting rod in an eccentric state with the center axis of the piston pin;
a first plunger movably disposed in a first plunger space formed at a side inside the piston pin so as to control a rotational position of the small diameter eccentric cam by controlling oil supplied to first and second chambers formed between the outer circumference surface of the small diameter eccentric cam and an inner circumference surface of the large diameter eccentric cam according to a control position;
a second plunger movably disposed in a second plunger space formed at an other side inside the piston pin so as to control a rotational position of the large diameter eccentric cam by controlling oil supplied to third and fourth chambers formed between an outer circumference surface of the large diameter eccentric cam and the inner circumference surface of the small end portion according to a control position; and
first and second oil injection nozzles disposed at a side and an other side of a lower portion of the piston, respectively, and configured to control the control position of the first and second plungers by supplying hydraulic pressure to an end portion of the first plunger and an other portion of the second plunger through first and second guide passages formed inside the piston by injecting oil to the lower portion of the piston.

2. The variable compression ratio apparatus of claim 1, wherein
a first pocket is formed at a lower side of the piston, and a first guide passage is formed inside the piston so as to deliver oil from the first pocket to the end portion of the first plunger, and
wherein a second pocket is formed at an other lower side of the piston, and a second guide passage is formed inside the piston so as to deliver oil from the second pocket to an other end of the second plunger.

3. The variable compression ratio apparatus of claim 2, wherein
the first and second oil-jet injection nozzles control positions of the first and second plungers by injecting oil to the first and second pockets and delivering oil to the end portion of the first plunger and the other portion of the second plunger through the first guide passage and the second guide passage.

4. The variable compression ratio apparatus of claim 2, wherein
a groove that is divided into the first chamber and the second chamber by a first protrusion protruded from a side of an outer circumference surface of the small diameter eccentric cam is formed on the inner circumference surface of the large diameter eccentric cam, and
wherein a groove that is divided into the third chamber and the fourth chamber by a second protrusion protruded from a side of an outer circumference surface of the large diameter eccentric cam is formed on the inner circumference surface of the small end portion of the connecting rod.

5. The variable compression ratio apparatus of claim 2, wherein
the first and second plungers are respectively disposed at a side and other side of inside of a valve body that penetrates a center portion of the piston pin in a length direction.

6. The variable compression ratio apparatus of claim 5, further comprising:
a first return spring disposed inside the valve body so as to elastically support the first plunger in a side; and
a second return spring disposed inside the valve body so as to elastically support the second plunger in other side.

7. The variable compression ratio apparatus of claim 6, wherein
a first check space is formed at an end portion of inside of the first plunger, and a second check space is formed at an other end portion of inside of the first plunger,
wherein a first check space connection passage is formed inside the first plunger to connect the first check space with the second check space,
wherein a portion on which the first check space and the second check space are formed on an outer circumference surface of the first plunger contacts an inner circumference of the first plunger space,
wherein a first small diameter portion is formed at a center portion where the first check space connection passage is formed in a predetermined gap with the first plunger space,
wherein in the first check space connection passage, a first open passage passing through an outer circumference surface is formed,
wherein in the first plunger, a first check passage that goes through outside is formed, and in the second check space, a second check passage that goes through outside is formed,
wherein in the valve body, a first supply passage connected to the first small diameter portion at all times and supplied with hydraulic pressure from the connecting rod is formed,
wherein a second chamber connection passage is formed, that is connected to the second check passage and connected to the second chamber through a side from an inner circumference surface to an outer circumference surface of the valve body, in a state that the first plunger is moved to a side by the first return spring, and
wherein a first chamber connection passage is formed, that is connected to the first check passage and connected to the first chamber through a side from the inner circumference surface to the outer circumference surface of the valve body, in a state that the first plunger is moved to other side by the first oil-jet injection nozzle.

8. The variable compression ratio apparatus of claim 7, further comprising:
a first check valve disposed in the first check space, inhibiting hydraulic pressure being transferred to the first check space connection passage from the first check space; and
a second check valve disposed in the second check space, inhibiting hydraulic pressure being transferred to the second check space connection passage from the second check space.

9. The variable compression ratio apparatus of claim 8, wherein the first and second check valves include a ball disposed in an oil passage, and a check spring for elastically supporting the ball.

10. The variable compression ratio apparatus of claim 6, wherein
a third check space is formed at an end portion of inside of the second plunger, and a fourth check space is formed at an other end portion of inside of the second plunger,
wherein a second check space connection passage is formed inside the second plunger to connect the third check space with the fourth check space,
wherein a portion on which the third check space and the fourth check space are formed on an outer circumference surface of the second plunger contacts an inner circumference of the second plunger space,
wherein a second small diameter portion is formed at a center portion where the second check space connection passage is formed in a predetermined gap with the second plunger space,
wherein in the second check space connection passage, a second open passage passing through an outer circumference surface is formed,
wherein in the second plunger, a third check passage that goes through outside is formed, and in the fourth check space, a fourth check passage that goes through outside is formed,
wherein in the valve body, a second supply passage connected to the second small diameter portion at all times and supplied with hydraulic pressure from the connecting rod is formed,
wherein a fourth chamber connection passage is formed, that is connected to the third check passage and connected to the fourth chamber through a side from an inner circumference surface to an outer circumference surface of the valve body, in a state that the second plunger is moved to other side by the second return spring, and
wherein a third chamber connection passage is formed, that is connected to the fourth check passage and connected to the third chamber through a side from the inner circumference surface to the outer circumference surface of the valve body, in a state that the first plunger is moved to other side by the second oil-jet injection nozzle.

11. The variable compression ratio apparatus of claim 10, further comprising:
a third check valve disposed in the third check space, inhibiting hydraulic pressure being transferred to the first check space connection passage from the third check space; and
a fourth check valve disposed in the fourth check space, inhibiting hydraulic pressure being transferred to the second check space connection passage from the fourth check space.

12. The variable compression ratio apparatus of claim 11, wherein the third and fourth check valves include a ball disposed in the oil passage, and a check spring for elastically supporting the ball.

13. The variable compression ratio apparatus of claim 6, further comprising:
first and second oil-jet control valves controlling oil injected from the first and second oil-jet injection nozzles; and
a control unit controlling the first and second oil-jet control valves according to an operation condition.

14. The variable compression ratio apparatus of claim 13, further comprising: an oil pump for pumping oil to the first and second oil-jet control valve.

15. The variable compression ratio apparatus of claim 13, wherein a main oil supply passage is formed inside the connecting rod, oil supplied to the main oil supply passage is supplied to a side of the first and second plungers, and the oil supplied to the main oil supply passage is transferred to each of the first, second, third and fourth chambers, whereby controlling rotational position of the small diameter eccentric cam or the large diameter eccentric cam according to a position of the first and second plungers.

16. The variable compression ratio apparatus of claim 6, wherein a bent hole is formed in the valve body for releasing hydraulic pressure therein to outside with being opened in the first and second plunger spaces in the first and second return springs to outside.

* * * * *